Feb. 7, 1933.  G. SZUCS  1,896,733
STEAM TRAP
Filed April 8, 1932
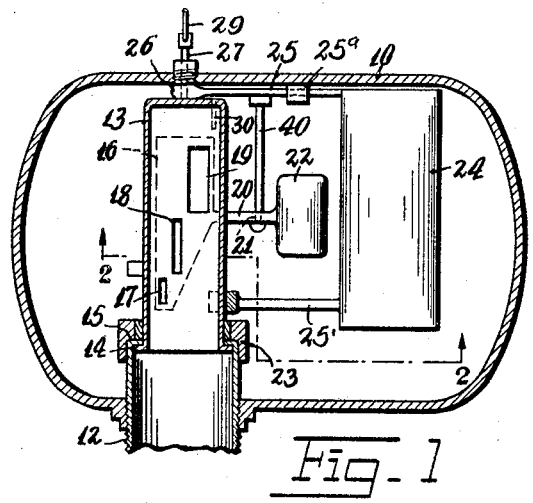
Fig. 1
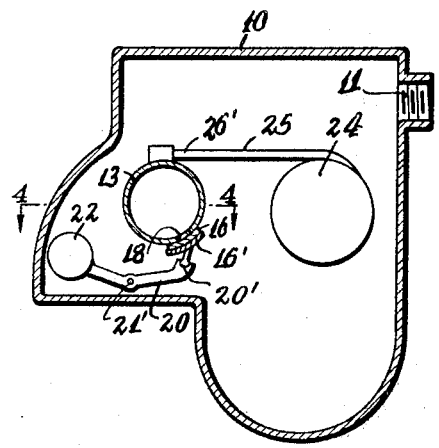
Fig. 3
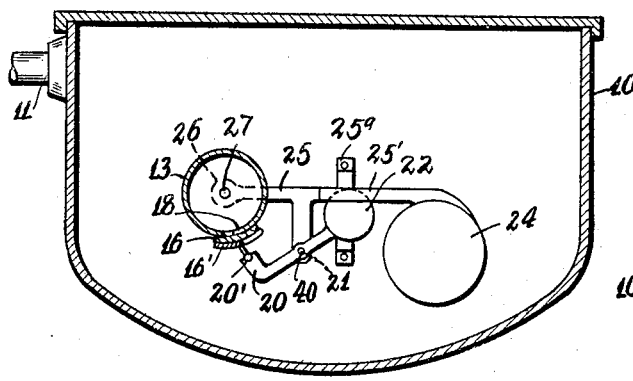
Fig. 2
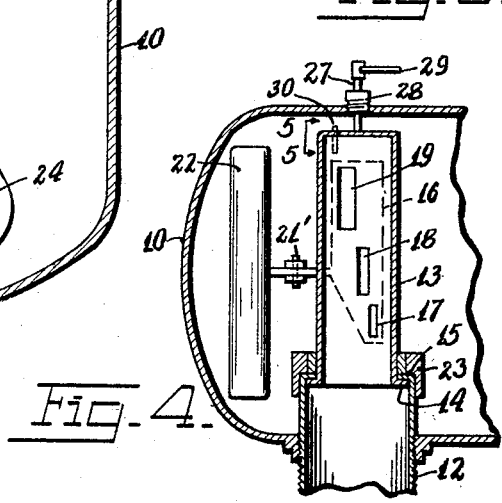
Fig. 4
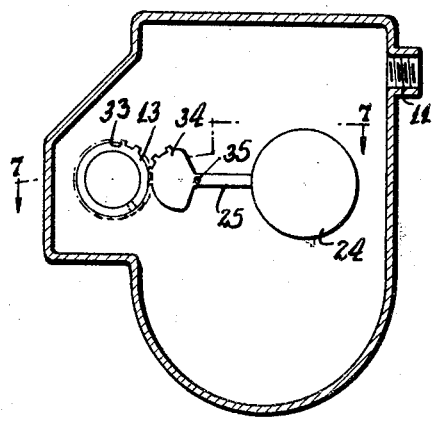
Fig. 6
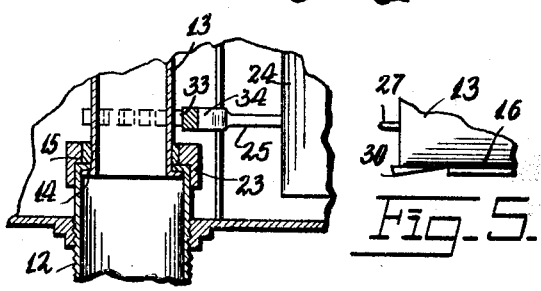
Fig. 7
Fig. 5
INVENTOR
GERGELY SZUCS
BY
Zoltan H Polachek
ATTORNEY Patented Feb. 7, 1933

1,896,733

UNITED STATES PATENT OFFICE

GERGELY SZUCS, OF ASTORIA, NEW YORK

STEAM TRAP

Application filed April 8, 1932. Serial No. 603,908.

This invention relates to new and useful improvements in a steam trap and a device for action as a discharge and relief valve, and adapted for high or low pressure and for large or small quantity of condensation water, the discharge quantity of water depends on pressure behind or relief water or any liquid or gas continuously if the trap is placed below the supply.

The invention has for an object the construction of a steam trap which is characterized by a hollow casing having an inlet, and an outlet pipe through the side of the casing connected with a mechanism to only allow water to pass out after the water level has reached a certain height.

A still further object of this invention is the construction of a cup rotative upon the inner end of the inlet pipe and provided with various sized openings normally held closed by a valve urged into operative position with a counterweight.

Futhermore, the invention has for a still further object the provision of a float adapted to turn said cup when the water height has reached a certain level to allow its discharge and to turn the cup further into position in which a greater amount of water may be discharged.

The invention still further proposes the provision of means whereby the cup may be moved laterally to cause the valve to assume a position in which all of the openings are open.

A still further object of this invention is the construction of a device of the class described which is of simple durable construction, dependable in use and efficient in operation, and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a horizontal sectional view of a steam trap constructed according to this invention.

Fig. 2 is a vertical sectional view taken on the line 2—2 of Fig. 1.

Fig. 3 is a transverse sectional view of a steam trap constructed according to a modification of this invention.

Fig. 4 is a fragmentary horizontal sectional view taken on the line 4—4 of Fig. 3.

Fig. 5 is an elevational view looking in the direction of the line 5—5 of Fig. 4.

Fig. 6 is a view similar to Fig. 3 but illustrating a modification.

Fig. 7 is a sectional view taken on the line 7—7 of Fig. 6.

The steam trap, according to this invention, comprises a hollow casing 10 having an inlet 11 near its upper end. An outlet pipe 12 projects from one side of the casing intermediate of its height. A cup 13 is rotatively mounted within the inside of the casing and on the outlet pipe 12. A rotative mounting is accomplished by outturned flanges 14 upon the edge of the cup engaging against the inside diameter of the pipe 12 and inturned flanges 15 from the pipe 12 engaging against the outside diameter of the cup 13. A valve 16 acts against the side of the cup and normally holds a plurality of openings 17, 18 and 19 in the cup closed.

The valve 16 is mounted upon an arm 20 pivotally mounted intermediately at 21, upon a pin 40 projecting from a stem 25 pivoted at one end on a stud 27, and at its other end provided with a weight 22 serving to urge the valve closed. The valve 16 preferably should be of felt and removably mounted on the arm 20 by reason of a dovetailed construction 16'. A universal joint 20' connected the head of the arm upon the main portion thereof to insure proper seating of the valve. The openings 17, 18 and 19 are of different sizes and arranged relative to the valve 16 in a manner so that when the valve is turned first the smallest opening is moved out from beneath the valve and then the next and finally the largest opening. A packing ring 23 is mounted upon the inner end of the pipe 12 to prevent leakage between the pipe and cup. One end of float 24 is mounted upon a stem 25 pivoted at one end 26 on the stem 27 of the cup 13 to cause turning of the valve 16 as water is formed within the casing. The other end of the float 24 is mounted on an arm 25' which freely swivels about the cup 13. The stem 25 is prevented from sliding away from the casing 10 by a long strap 25ᵃ which allows pivotal motion of stem 25.

The cup 13 may be longitudinally slid coaxially with the pipe 12. The stem 27 is attached upon the closed end of the cup and passes through a packing box 28 to the exterior. A ring 29 is mounted upon the free end of the stem so that it may be manually moved. A cam 30 is mounted along a longitudinal element on the cup 13 and is adapted, when the cup 13 is moved inwards, to move the valve 16 to an open position to allow all of the openings to be unrestricted.

In Figs. 3, 4 and 5 a modified form of a steam trap has been disclosed in which the valve 16 is pivotally mounted intermediately upon lugs 21' integral with the casing 10. The stem which is connected with the float 24 is in direct connection at its rear end 26' with the cup 13 so as to turn the cup as the water level changes. In this particular case the valve remains stationary while the cup turns, but in the previous form the cup remains stationary and the valve moves.

In Figs. 6 and 7 a modification of the invention has been disclosed in which the connection between the float and the cup is different. More particularly, a gear 33 is mounted upon the periphery of the cup 13 and is engaged by a segment 34 fixed on the stem 25 which is connected with the float 24. The stem 25 is pivotally mounted by a shaft 35 supported within the casing 10. In other respects both devices are similar and may be recognized by corresponding reference numerals.

In operation, when water collects within the casing 10 due to condensation, the float will rise and cause turning of the valve 16 or cup 13 depending upon the different forms of the invention so that the openings in the cup are opened. The water may then run off along these openings but the steam cannot escape since the openings are below the water level. When the water level falls the cup turns and automatically closes the openings against the valve.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A steam trap, comprising a hollow casing having an inlet near the top, an outlet pipe extended in through the side of the casing intermediate of its height, a cup rotatively mounted on the inner end of said pipe and having openings on its bottom side, a valve acting against the bottom side of said cup for closing said openings, a weight connected with said valve to hold the valve closed, and a float connected with said cup to turn the cup when water collects within the hollow body above a pre-determined height.

2. A steam trap, comprising a hollow casing having an inlet near the top, an outlet pipe extended in through the side of the casing intermediate of its height, a cup rotatively mounted on the inner end of said pipe and having openings on its bottom side, a valve acting against the bottom side of said cup for closing said openings, a weight connected with said valve to hold the valve closed, and a float connected with said cup to turn the cup when water collects within the hollow body above a pre-determined height, said cup and outlet pipe having interengaging flanges.

3. A steam trap, comprising a hollow casing having an inlet near the top, an outlet pipe extended in through the side of the casing intermediate of its height, a cup rotatively mounted on the inner end of said pipe and having openings on its bottom side, a valve acting against the bottom side of said cup for closing said openings, a weight connected with said valve to hold the valve closed, and a float connected with said cup to turn the cup when water collects within the hollow body above a pre-determined height, said cup and outlet pipe having interengaging flanges, and a packing ring being mounted upon the pipe and acting against the side of the cup.

4. A steam trap, comprising a hollow casing having an inlet near the top, an outlet pipe extended in through the side of the casing intermediate of its height, a cup rotatively mounted on the inner end of said pipe and having openings on its bottom side, a valve acting against the bottom side of said cup for closing said openings, a weight connected with said valve to hold the valve closed, a float connected with said cup to turn the cup when water collects within the hollow body above a pre-determined height, a stem projecting from the closed end of said cup to the exterior, a cam upon said cup adapted to engage beneath the valve when the cup is moved laterally.

5. A steam trap, comprising a hollow casing having an inlet near the top, an outlet pipe extended in through the side of the casing intermediate of its height, a cup rotatively mounted on the inner end of said pipe and having openings on its bottom side, a valve acting against the bottom side of said cup for closing said openings, a weight connected with said valve to hold the valve closed, a float connected with said cup to turn the cup when water collects within the hollow body above a pre-determined height, a stem projecting from the closed end of said cup to the exterior, a cam upon said cup adapted to engage beneath the valve when the cup is moved laterally, a packing box engaging around said stem and in said hollow casing.

6. A steam trap, comprising a hollow casing having an inlet near the top, an outlet pipe extended in through the side of the casing intermediate of its height, a cup rotatively mounted on the inner end of said pipe and having openings on its bottom side, a valve acting against the bottom side of said cup for closing said openings, a weight connected with said valve to hold the valve closed, and a float connected with said cup to turn the cup when water collects within the hollow body above a pre-determined height, said float being connected with a stem attached upon said cup.

7. A steam trap, comprising a hollow casing having an inlet near the top, an outlet pipe extended in through the side of the casing intermediate of its height, a cup rotatively mounted on the inner end of said pipe and having openings on its bottom side, a valve acting against the bottom side of said cup for closing said openings, a weight connected with said valve to hold the valve closed, and a float connected with said cup to turn the cup when water collects within the hollow body above a pre-determined height, said float being connected with a stem having a sector gear at its free end, means pivotally supporting said stem, and a gear mounted upon the periphery of said cup and meshing with said sector gear.

8. A steam trap, comprising a hollow casing having an inlet near the top, an outlet pipe extended in through the side of the casing intermediate of its height, a cup rotatively mounted on the inner end of said pipe and having openings on its bottom side, a valve acting against the bottom side of said cup for closing said openings, a weight connected with said valve to hold the valve closed, and a float connected with said cup to turn the cup when water collects within the hollow body above a pre-determined height, said float being connected with a stem having a sector gear at its free end, means pivotally supporting said stem, and a gear mounted upon the periphery of said cup and meshing with said sector gear, said means for holding the stem comprising a shaft engaged through the stem and supported in said casing.

9. A steam trap, comprising a hollow casing having an inlet near the top, an outlet pipe extended in through the side of the casing intermediate at its height, a cup mounted on the inner end of said pipe and having openings at its bottom side, a valve acting against the bottom side of said cup for closing the openings, an arm connected with said valve and intermediately pivoted upon another arm rotative coaxially on said cup, a counterweight upon the arm connected with the valve, and a float connected upon the arm coaxial with the cup for raising and falling as the water lever changes to move the valve correspondingly.

10. A steam trap, comprising a hollow casing having an inlet near the top, an outlet pipe extended in through the side of the casing intermediate at its height, a cup mounted on the inner end of said pipe and having openings at its bottom side, a valve acting against the bottom side of said cup for closing the openings, and means for opening the openings when water collects within the hollow casing above a predetermined height.

11. A steam trap, comprising a hollow casing having an inlet near the top, an outlet pipe extended in through the side of the casing intermediate at its height, a cup mounted on the inner end of said pipe and having openings at its bottom side, a valve acting against the bottom side of said cup for closing the openings, and means for opening the openings when water collects within the hollow casing above a predetermined height, including a float.

In testimony whereof I have affixed my signature.

GERGELY SZUCS.